United States Patent [19]

Hidaka et al.

[11] 3,939,929

[45] Feb. 24, 1976

[54] APPARATUS FOR REGULATING SUPPLY QUANTITY OF TEXTILE FIBERS TO A WEIGHING DEVICE

[75] Inventors: Hideo Hidaka, Aichi; Setsuo Yamamoto, Obu, both of Japan

[73] Assignee: Kabushiki Kaisha Toyoda Jidoshokki Seisakusho, Kariya, Japan

[22] Filed: Feb. 21, 1975

[21] Appl. No.: 551,655

Related U.S. Application Data

[63] Continuation-in-part of Ser. No. 466,723, May 3, 1974, abandoned.

[30] Foreign Application Priority Data

May 9, 1973  Japan.............................. 48-51382
May 9, 1973  Japan.............................. 48-51383

[52] U.S. Cl. ............................................. 177/121
[51] Int. Cl.² ....................................... G01G 13/04
[58] Field of Search .......................... 177/119–123, 177/145; 222/55

[56] References Cited
UNITED STATES PATENTS

| 1,579,219 | 4/1926 | Lowndes............................ 177/210 |
| 2,597,831 | 5/1952 | Willis................................. 177/119 X |
| 2,702,177 | 2/1955 | Jee et al............................. 177/121 X |
| 2,825,523 | 3/1958 | Bokum................................ 177/119 X |
| 2,891,780 | 6/1959 | Reynolds............................ 177/145 X |
| 2,933,281 | 4/1960 | Hyde et al.......................... 177/121 |
| 2,995,783 | 8/1961 | Lytton................................ 177/119 X |
| 3,119,525 | 1/1964 | Flynn.................................. 177/121 X |
| 3,258,164 | 6/1966 | Stradling............................ 177/145 X |

*Primary Examiner*—George H. Miller, Jr.

[57] ABSTRACT

In a spinning machine having a weighing device for receiving fiber tufts from a hopper thereof and for intermittently supplying a block of fiber tufts of a predetermined quantity to a subsequent process by repeated unit supply operations, the gauge between a lifting apron and an evener cylinder of the opening machine is reduced to a predetermined small gauge during a last period of each unit supply operation. Further the driving speed of the lifting apron is capable of selectively reducing during the above-mentioned last period and the supplying operation is continued until the quantity of fiber tufts accumulated in a weigh pan of the weighing mechanism becomes a predetermined final quantity for the unit supply operation.

10 Claims, 14 Drawing Figures

APPARATUS FOR REGULATING SUPPLY QUANTITY OF TEXTILE FIBERS TO A WEIGHING DEVICE

SUMMARY OF THE INVENTION

The present invention relates to an apparatus for regulating supply quantity of textile fibers to a weighing device of a textile machine such as an opening machine and is a continuation-in-part application of the pending patent application, Ser. No. 466,723, filed on May 3, 1974, now abandoned.

In the conventional opening machine provided with a weighing device, the fiber tufts are supplied to the weighing device intermittently in such a manner that, when a predetermined quantity of fiber tufts are accumulated in the weighing device, the supply motion of fiber tufts to the weighing device is stopped and the accumulated block of fiber tufts is discharged from the weighing device toward a subsequent process, and then the supply of fiber tufts to the weighing device is again commenced, and when the quantity of fiber tufts accumulated in the weighing device becomes the above-mentioned predetermined quantity, further supply of the fiber tufts to the weighing device is stopped and the accumulated block of fiber tufts is discharged from the weighing device. As mentioned above, a unit supply operation from commencing the supply motion to stop the supply motion is repeated during the mill operation. The above-mentioned unit supply operation is hereinafter referred to as a unit operation or unit supply operation. And the above-mentioned predetermined quantity of fiber tufts accumulated in the weighing device during a unit operation is hereinafter referred to as "a supply unit of fiber tufts".

At the initial stage of a unit operation for supplying textile fibers to the automatic weighing device, a lifting apron for supplying the textile fibers to the weighing device is driven at a speed which is comparatively faster than the driving speed thereof at the final stage of each unit supply operation. At the final stage of the unit operation when the quantity of fiber tufts supplied to the weighing device has reached a predetermined value, the lifting apron is driven at a reduced speed in order to supply the fiber tufts in supply rates which are as small as possible.

According to our experience, if the speed ratio between the driving speeds of the lifting apron at the initial and final stages of the unit operation is fixed at a large value, the desired results of shortening the unit operation, maintaining machine efficiency, maintaining precision of weighing, etc., may be expected. However, there are still problems to be solved, for example, if the type of raw textile fibers are changed, the above-mentioned ratio of the driving speeds of the lifting apron should be changed to fit the material. Moreover, it has been confirmed that there is a certain upper limit of weighing precision which cannot be satisfied by applying the above-mentioned method.

The principle purpose of the present invention is to provide an improved apparatus for regulating the supply quantity of textile fibers in a unit operation whereby the most desirable results in the technical sense of productivity of the machine and creation of high precision blending of the textile materials can be achieved.

To attain the purpose of the present invention, in the apparatus provided with a lifting apron for supplying fiber tufts to a weighing device and an evener cylinder disposed at a position adjacent to a top roller of the lifting apron with an intervening space between the lifting apron and the evener cylinder, the evener cylinder is rotatably supported by a supporting means in such a way that the intervening space between the lifting apron and the evener cylinder is narrowed gradually or in steps in accordance with a predetermined program for each unit operation. Thus, the supply rate of the textile fibers supplied from the lifting apron to the weighing device becomes very small so as to increase the precision of the regulating operation for supplying the fiber tufts to the weighing device in a unit supplying operation. In a modified apparatus according to the present invention, the driving speed of the lifting apron is also lowered according to the predetermined program while applying the above-mentioned adjustment of the intervening space between the lifting apron and the evener cylinder. Therefore, more effective results in the precision of the regulating operation and the productivity of the apparatus can be expected. We have confirmed from mill tests that the above-mentioned modified apparatus is desirable for blending different kinds of textile fibers.

Other purposes and the characteristic features of the present invention will be clarified by the following illustration of the invention with reference to the attached drawings, although modifications of the following embodiments in the spirit of the claims are in no way limited.

DETAILED DESCRIPTION OF THE INVENTION

Figure 1:
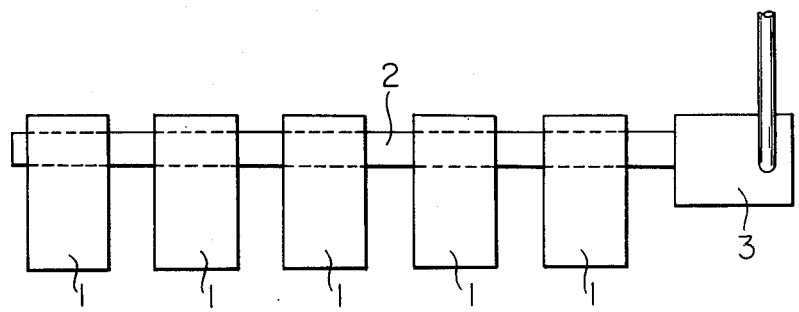
FIG. 1 is a schematic plan view of the opening process with a plurality of opening machines provided with an apparatus for regulating the supply quantity of textile fibers according to the present invention.
Figure 2:
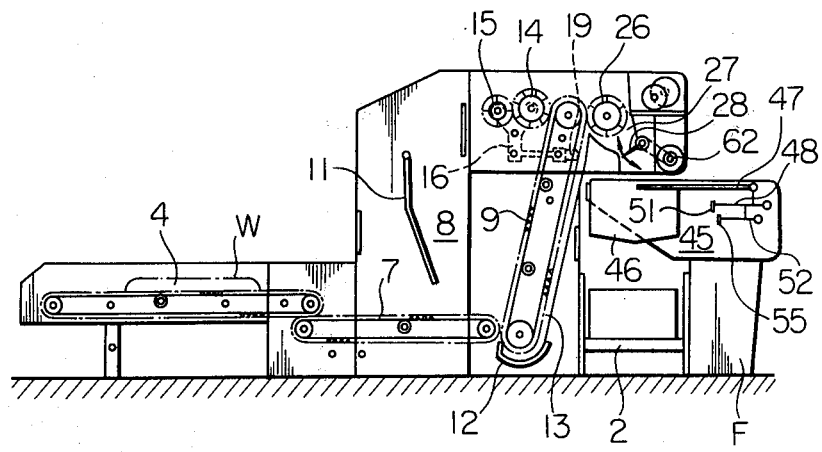
FIG. 2 is a schematic side view of each opening machine shown in FIG. 1.
Figure 3:
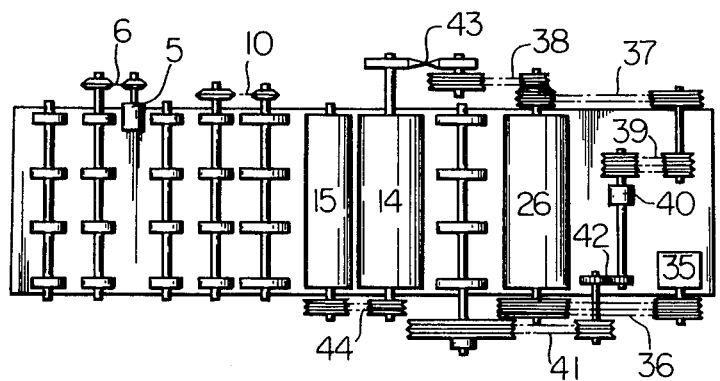
FIG. 3 is a plan view of a driving mechanism of the opening apparatus shown in FIG. 2.
Figure 4:
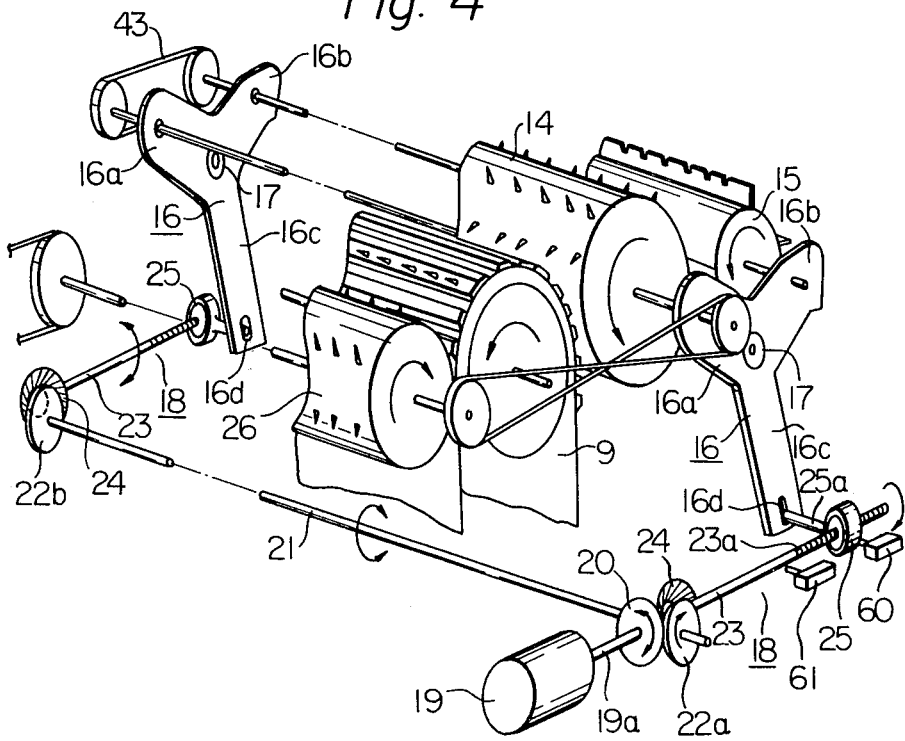
FIG. 4 is a perspective view of a main part of the regulating apparatus according to the present invention.
Figure 5:
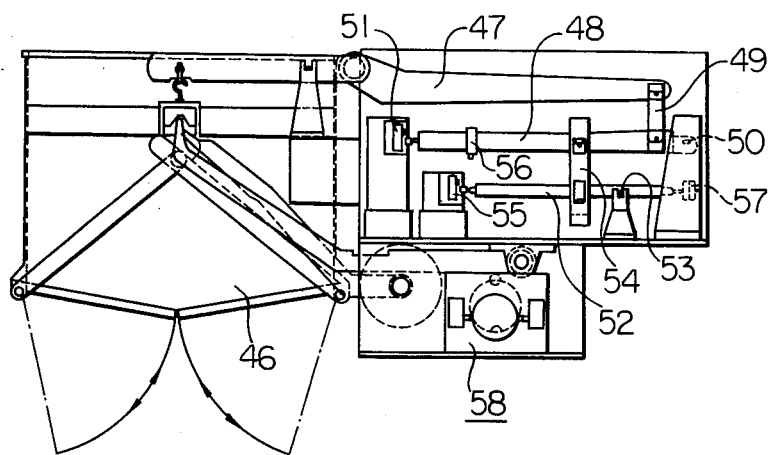
FIG. 5 is a schematic side view of a weigh-pan utilized for the regulating device shown in FIG. 2.

In the opening process, as shown in FIG. 1, for opening supplied material fibers and blending them, a plurality of opening machines, for example 5 opening machines 1 provided with an apparatus for regulating the supply quantity of textile fibers, are arranged in a row and an endless conveyer belt 2 for receiving fiber tufts from the above-mentioned regulating apparatus of each opening machine 1 is disposed at a position immediately below the discharge outlets of these regulating apparatus. The conveyer belt 2 is connected to a device 3 for opening and transferring the textile material to the subsequent process. Referring to FIGS. 2 and 3, in each opening machine 1, a feed apron 4 is driven by a gear motor 5 by way of a chain drive mechanism 6 and driving of the gear motor 5 is stopped or started by the action of an on-off limit switch (not shown) which is actuated by a detecting arm 11. In a hopper 8, a bottom apron 7 is disposed. A lifting apron 9, the driving speed of which can be changed, is disposed in the hopper 8 to supply textile fibers W carried from the bottom apron 7 to a weighing device. The driving mechanism of the lifting apron 9 is connected to the bottom apron 7 by way of a chain driving mechanism 10. A detecting arm 11 is disposed in the hopper 8. When a mass of textile fibers W in the hopper 8 reaches a predetermined quantity according to the difference between the rate of feeding textile fibers into the hopper 8 by the bottom apron 7 and the rate of transferring textile fibers from the hopper 8 into the weighing device, the detecting arm 11 is forced to turn by the pushing force created by the mass of the textile fibers so that a limit switch (not shown) is actuated by the turning motion of the detecting arm 11. Consequently, driving of the gear motor 5 and the feed apron 4 is stopped. In FIG. 2, a perforated sheet and a back sheet are represented by 12 and 13. An evener cylinder 14 is rotatably disposed at a position adjacent to a top end portion of the lifting apron 9 and a stripper 15 is rotatably disposed in such a way that fiber tufts adhering to the evener cylinder 14 are stipped away by the action thereof. As is clearly shown in FIG. 4, the evener cylinder 14 and the stripper 15 are rotatably supported by respective bearings rigidly mounted on a pair of Y shaped arms 16. Each arm 16 is provided with a pair of supporting arms 16a, 16b and a guide arm 16c which extends downwards. The guide arm 16c is provided with a guide slot 16d. That is, the evener cylinder 14 is turnably mounted on the bearing supported by the arm 16a while the stripper 15 is turnably mounted on the bearing supported by the arm 16c. Each arm 16 is capable of turning about a pivot shaft 17 according to the motion of respective actuation mechanisms 18 which are controlled by a pilot motor 19. The pilot motor 19 is capable of turning clockwise or counterclockwise alternatively and is mounted on an upper portion of the opening machine 1 as shown in FIG. 2. As the construction of the Y shaped arms 16 on both sides of the machine are identical and the actuation mechanisms 18 are also identical, only those of the right hand side in FIG. 4 are illustrated hereinafter. A main bevel gear 20 is secured to an end of a motor shaft 19a, and a horizontal shaft 21 is transversely disposed in such a way that a bevel gear 22a secured to an end of the horizontal shaft 21 meshes with the main bevel gear 20. At the other end of the horizontal shaft 21, there is provided another bevel gear 22b. A shaft 23 is turnably supported by a bearing (not shown) and a bevel gear 24 secured to the shaft 23 meshes with the bevel gear 22a enabling the shaft 23 to turn clockwise or counterclockwise alternatively according to the turning motion of the pilot motor 19. The shaft 23 is provided with a threaded portion 23a formed at the free end thereof and a nut-like member 25 is thread-engaged with the threaded portion 23a of the shaft 23. The member 25 is provided with a horizontal rod 25a extending therefrom toward the guide arm 16c such a condition that the horizontal rod 25a is slidably engaged with the slot 16d. Consequently, when the shaft 23 is rotated, the member 25 is displaced toward or away from the bevel gear 24 according to the rotational direction of the shaft 23. Consequently, the guide arm 16c is turned clockwise or counterclockwise about the pivot shaft 17. The actuation mechanism 18 comprises the above-mentioned gear trains and the threaded engagement of the member 25 with the shaft 23 and the sliding engagement of the rod 25a into the slot 16d. The bevel gear 22b meshes with the bevel gear 24 of the other actuation mechanism 18 disposed at the left hand side of FIG. 4.

According to the above-mentioned mechanism, the intervening space, that is the gauge, between the lifting apron 9 and the evener cylinder 14, can be selectively adjusted. A doffer 26 is disposed at a position adjacent to the lifting apron 9 in order to take off textile fibers W in the direction of a feed chute 27 provided with a shutter 28. The motion of the shutter 28 is actuated by a solenoid 62 disposed at a position outside the feed chute 27 in such a way that when the solenoid 62 is actuated, the shutter 28 closes the discharge aperture of the feed chute 27.

The driving mechanism of the above-mentioned opening machine is hereinafter described in detail.

Referring to FIG. 3, the doffer 26 is driven by a main motor 35 by way of a first pulley-power transmission mechanism 36, which in turn drives a second pulley-power transmission mechanism 37 and a third pulley-power transmission mechanism 38. The second pulley-power transmission mechanism 37 drives a fourth pulley-power transmission mechanism 39 provided with a clutch 40, and a fifth pulley-power transmission mechanism 41 is driven by the fourth pulley-power transmission mechanism 39 by way of a gear train 42. The lifting apron 9 is driven by the fifth pulley-power transmission mechanism 41. The third pulley-power transmission mechanism 38 drives a sixth pulley-driving mechanism 43 which drives the evener cylinder 14. The stripper 15 is driven by a seventh pulley-driving mechanism 44 to which driving power is transmitted from the evener cylinder 14.

Referring to FIGS. 2 to 5, a weighing device 45 is mounted on a machine frame F independently from the supply mechanism of the opening machine 1. The weighing device 45 is provided with a weigh-pan 46 disposed below the feed chute 27, and the weigh-pan 46 pivotably mounted on the machine frame F and connected to a balance rod 47. The free end of the balance rod 47 is connected to a first balance measuring rod 48 by a connecting member 49. The first balance measuring rod 48 is supported by a fulcrum 50 and its free end is capable of moving along a passage facing a first sensing device 51 which actuates the above-mentioned pilot motor 19 in order to decrease the gauge between the lifting apron 9 and the evener cylinder 14 when a detector of the first sensing device 51 meets the free end of the rod 48. A second balance measuring rod 52 is supported by a fulcrum 53 and connected to the first balance measuring rod 48 by a connecting member 54, and a free end thereof is capable of moving along a passage facing a second sensing device 55 which actuates the above-mentioned clutch 40 when a detector of the second sensing device 55 meets the free end of the rod 52. A balance weight 56 is slidably mounted on the rod 50 and it is used to set the predetermined quantity of fiber tufts supplied into the weigh-pan 46 so as to actuate the pilot motor 19 for reducing the above-mentioned gauge between the lifting apron 9 and the evener cylinder 14. An adjusting weight 57 is mounted on the other free end of the rod 52 which is used for actuating the clutch 40 when the quantity of textile fibers in the weigh-pan 46 reaches a predetermined maximum value. As shown in FIGS. 1 and 2, the conveyer belt 2 is disposed below the weigh-pan 46.

The construction of the weigh-pan 46 is quite similar to that of the "Fiber Meter" manufactured by the U.S. Corporation "The Textile Equipment Corporation", and is actuated by an actuation mechanism 58 which is actuated by the signal issued from the second sensing device 55.

As mentioned above, the blocks of textile fibers W fed on the feed apron 4, which is driven by gear motor 5 are carried to the bottom apron 7 and then picked up by the lifting apron 9 and moved upwards. And when the textile fibers W are carried to the top portion of the lifting apron 9 to the entrance of the intervening space between the apron 9 and the evener cylinder 14, which is rotating at its initial position, the fiber tufts are opened by the beating action of the evener cylinder 14 and some of them are dropped toward the bottom apron 7. The fiber tufts, which pass the above-mentioned intervening space, are taken from the lifting apron 9 by the action of the doffer 26 and dropped in the feed chute 27 so as to be supplied into the weigh-pan 46 successively.

When the quantity of fiber tufts supplied in the weigh-pan 46 reaches the above-mentioned predetermined value, the balance rod 47 inclines so that the free end of the first balance measuring rod 48 meets the detector of the first sensing device 51. Consequently, the sensing device 51 actuates the pilot motor 19 to operate the actuation mechanism 18. As a result, the shaft 23 is rotated in the direction which displaces the nut-like member 25 so as to turn the guide arm 16c counterclockwise in FIG. 4. Therefore, the gauge between the lifting apron 9 and the evener cylinder 14 is reduced. To control the action of the pilot motor 19, a pair of limit switches 60 and 61 are disposed at positions along the path of movement of the nut-like member 25 in such a condition that the nut-like member 25 actuates the limit switch 60 or 61 according to its displacement (FIG. 4). When the nut-like member 25 contacts the limit switch 60 according to its above-mentioned displacement, the connection between the electric source and the pilot motor 19 is opened in order to stop the rotation of the pilot motor 19. Consequently, the supply motion of the fiber tufts into the weigh-pan 46 at the above-mentioned reduced gauge is continued. When the second sensing device 55 detects the above-mentioned predetermined final condition, it issues a signal to actuate the clutch 40 so as to stop the driving of the lifting apron 9 and, simultaneously, to operate a solenoid 62 which closes the shutter 28 and to actuate a solenoid (not shown) of the actuation mechanism 58 to open the weigh-pan 46. Therefore, a block of accumulated fiber tufts in the weigh-pan 46 is dropped on the conveyer belt 2 and is carried to the device 3 for opening and transferring material. The above-mentioned signal from the second sensing device 55 is transmitted to the clutch 40, solenoid 62 and the actuation mechanism 58 by way of a conventional timer switch (not shown). Consequently, after a predetermined time interval, due to the action of the timer switch, the clutch 40 is actuated to return to its normal running condition, the solenoid 62 and the actuation mechanism 58 are de-energized so that the shutter 28 is opened and the weigh-pan 46 is closed again. During the above-mentioned time-interval, a relay (not shown), which connects the pilot motor 19 with the electric source, changes the mode of connection due to the signal from the second sensing device 55 in order to rotate the pilot motor 19 in a direction opposite to the above-mentioned rotation due to the action by the first sensing device 51. And when the nut-like member 25 actuates the second limit switch 61, the connection between the pilot motor 19 and the electric source is opened and the motion of the pilot motor 19 is stopped. Therefore, before restarting the supply motion of the fiber tufts by the lifting apron 9, the gauge between the lifting apron 9 and the evener cylinder 14 is returned to its initial condition.

Figure 6A:
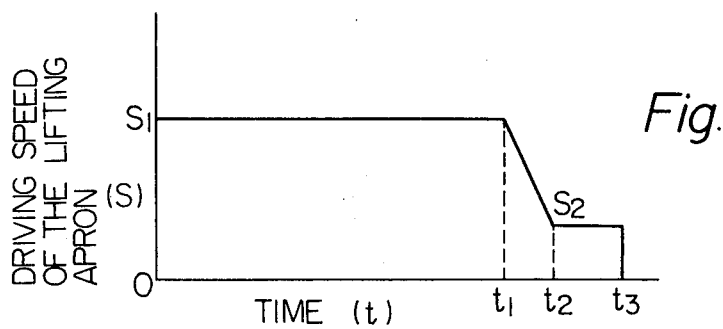
FIGS. 6A and 6B are comparative diagrams to indicate the effect of the regulating motion of the apparatus according to the present invention and a conventional apparatus respectively.
Figure 6B:
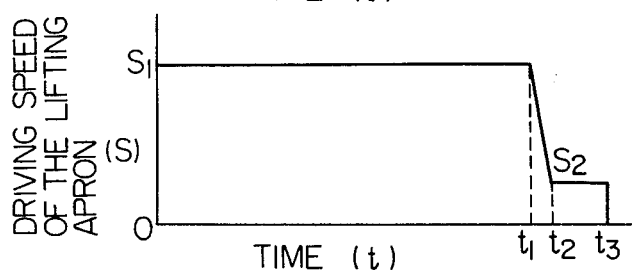

To clarify the characteristic feature of the above-mentioned embodiment of the present invention, the mode of supplying fiber tufts into the weigh-pan 46 is illustrated in comparison with that of a conventional apparatus. Referring to FIGS. 6A and 6B, in a conventional apparatus for regulating supply quantity of textile fibers, the driving speed S of the lifting apron is changed at a final stage for supplying textile fibers to the weigh-pan 46 in each unit operation. At the starting point of the unit operation, the lifting apron 9 is driven at a higher speed $S_1$ and after operation for a time $t_1$, the driving speed S is gradually reduced to a slower speed $S_2$ in a period between the time points $t_1$ and $t_2$, and the supply motion by the lifting apron 9 is further continued from the time point $t_2$ to time point $t_3$ where the unit operation is completed, as shown in FIG. 6A. However, according to our experience, it is very difficult to restrict the quantity or size of fiber tufts fed into the weigh-pan 46 to a sufficiently small size to increase the precision of the supply motion because the gauge between the lifting apron 9 and the evener cylinder 14 is maintained constant. Further, as the speed for supplying the fiber tufts to the weigh-pan 46 is reduced, a longer time is required to complete the unit supply operation in comparison with a conventional apparatus having a lifting apron 14 which is driven at a constant speed.

As previously described in the first embodiment of the present invention, even though the driving speed of the lifting apron 9 is maintained at a constant high speed, as the gauge between the lifting apron 9 and the evener cylinder 14 is quickly reduced in the period between the time points $t_1$ and $t_2$ after the accumulated quantity of the fiber tufts in the weigh-pan 46 reaches a predetermined first condition at the time point $t_1$, the quantity or size of the fiber tufts can be considerably reduced and the supply rate of the fiber tufts into the weigh-pan 46 can also be reduced from $S_1$ to $S_2$ which is a desirable condition. After the time point $t_2$, the supply motion is carried out with the above-mentioned reduced gauge as is indicated in FIG. 6B. Therefore, the supply motion can be carried out very precisely. Further, the lifting apron 9 is driven at a high speed and the time interval between $t_1$ and $t_3$ can be reduced so that the entire time consumption for the unit operation can be reduced in comparison with the above-mentioned conventional apparatus indicated by FIG. 6A.

In the above-mentioned embodiment of the present invention, the weighing mechanism is separated from the opening and supplying mechanism of the opening machine 1. Consequently, any possible vibrations due to the driving mechanism or any possible influences on the weighing device due to air streams, etc., can be effectively avoided.

Figure 7A:
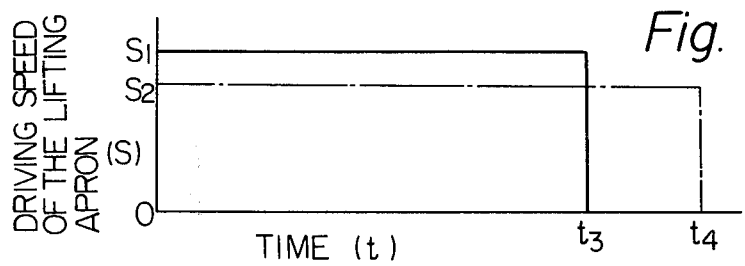
FIGS. 7A and 7B are comparative diagrams to indicate the effect of the regulating motion of a modified apparatus according to the present invention and another conventional apparatus respectively.
Figure 7B:
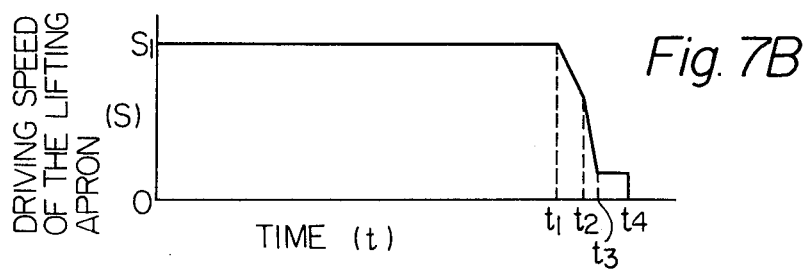

In the spinning mill, the so-called blended yarn is produced by mixing several different synthetic fibers and it is sometimes required to mix these different fibers with precise blending ratios, because of the high requirements for uniform dyeing. Under these circumstances, it is considered that, in the first embodiment where the lifting apron 9 is driven at a constant high speed, at the time point simultaneous to or just before or after changing the gauge between the lifting apron 9 and the evener cylinder 14, the driving speed of the lifting apron 9 may be reduced. For the sake of better understanding, the method of the supplying operation by the above-mentioned modification of the first embodiment is hereinafter illustrated in comparison with the conventional apparatus. Referring to FIGS. 7A and 7B, in the apparatus wherein the speed of the lifting apron 9 can be changed from the starting point of a unit operation, and the lifting apron 9 is then driven at a constant speed as shown in FIG. 7A, if it is required to reduce the entire time for operating the unit supply operation, the driving speed S should be increased to $S_1$ and the quantity or size of the fiber tufts is not so small that the precision of the weighing operation becomes difficult. On the contrary, if it is necessary to increase the precision of the weighing operation, it is preferable to drive the lifting apron 9 at as low a speed $S_2$ as possible. However, the entire time for the unit supply operation will inevitably be prolonged, in other words, the machine efficiency is reduced and as mentioned above, such a method of operation cannot be accepted. As shown in FIG. 6B, the method of the supplying operation wherein the driving speed S is decreased at the time point $t_1$ and the supplying operation is carried out at a constant speed $S_2$ from the time point $t_2$ up to the time point $t_3$, cannot satisfy the requirement of the present invention. However, in the second embodiment of the present invention, the driving speed of the lifting apron 9 is reduced between the time points $t_1$ and $t_2$ from $S_1$ to $S_2$. And, further, the gauge between the lifting apron 9 and the evener cylinder 14 is reduced in the above-mentioned period between $t_1$ and $t_2$ or just before or after the period between $t_1$ and $t_2$. Therefore, the entire time for carrying out the unit supplying operation can be effectively reduced, while the precision of the weighing operation can preferably be increased.

The detailed construction of the second embodiment of the present invention, which is characterized by the above-mentioned function is hereinafter described in detail. However, in the following description, the elements having constructions and functions identical to the elements of the first embodiment, are represented by identical reference numerals and the explanation of those elements is omitted.

Figure 10:
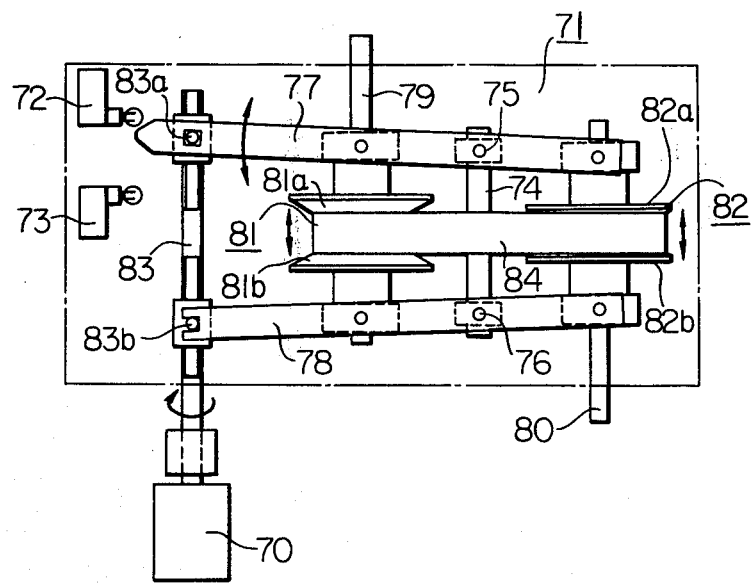
FIG. 10 is a schematic plan view (side view, plan view) of a speed regulating device utilized for the apparatus shown in FIG. 9.
Figure 8:
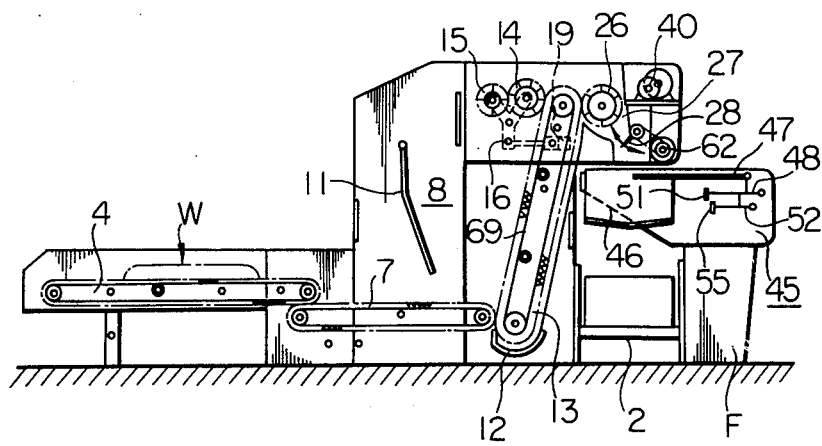
FIG. 8 is a schematic side view of an opening apparatus provided with a modified apparatus for regulating the supply quantity of textile fibers in a unit operation according to the present invention.
Figure 9:
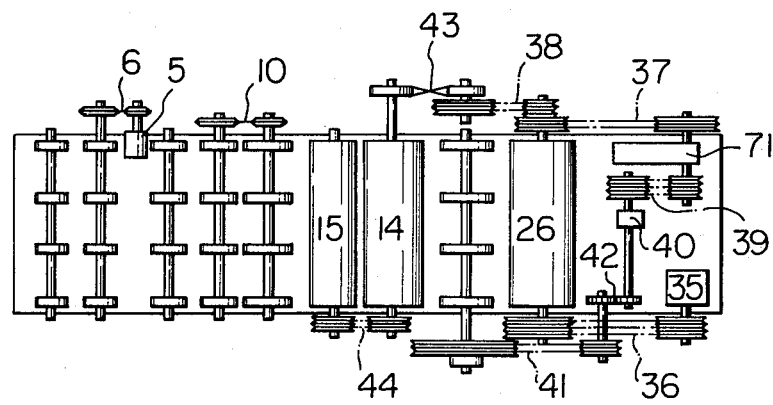
FIG. 9 is a plan view of a driving mechanism of the opening apparatus shown in FIG. 8.

Referring to FIGS. 8, 9 and 10, a lifting apron 69 is capable of being driven at variable speeds and the driving mechanism of the lifting apron 69 is connected to the bottom apron 7 by way of the chain driving mechanism 10. The actuation mechanism for driving the pilot motor 19 (FIG. 4) is constructed in such a way that the motor 19 is driven simultaneously with or just before or after changing the driving speed of the lifting apron 69. The driving mechanism of the opening machine shown in FIGS. 8, 9 and 10 is similar to the above-mentioned first embodiment except for the following points. That is, the first pulley-driving mechanism 36 drives a second pulley-driving mechanism 37 and the third pulley-driving mechanism 38. The second pulley-driving mechanism 37 drives a speed adjusting device 71 which is controlled by a control motor 70 electrically connected to the sensing means of the weigh-pan mechanism 45, and the fourth pulley-driving mechanism 39 provided with the clutch 40 is driven by the speed adjusting device 71, the fifth pulley-driving mechanism 41 is driven by the fourth pulley-driving mechanism by way of a gear train 42 and the lifting apron 69 is driven by the fifth pulley-driving mechanism 41. In this embodiment, the weigh-pan mechanism 45 has a construction almost similar to the first embodiment and is disposed below the feed chute 27. Therefore, only the construction different from the first embodiment is illustrated hereinafter. That is, the first sensing device 51 is electrically connected to the control motor 70 of the speed regulating device 71 and the second sensing device 55 is electrically connected to the clutch 40.

Next, the characteristic function of the second embodiment is hereinafter illustrated in detail. For the sake of better understanding, parts of the following illustration duplicate the above-mentioned illustration related to the first embodiment. In the operation of the opener 1 the blocks of the textile fibers W fed on the feed apron 4 are carried to the bottom apron 7 and then picked up by lifting apron 69 moving upward. When the fiber tufts of the material W is carried to the top portion of the lifting apron 9 to an entrance of the intervening space between the apron 69 and the evener cylinder 14, which is rotating at its initial position, the fiber tufts are opened by the beating action of the evener cylinder 14 and some of them are dropped toward the bottom apron 7. The fiber tufts which pass the above-mentioned intervening space are taken from the lifting apron 69 by the action of the doffer 26 and dropped in the feed chute 27 so as to be supplied into the weigh-pan 46 successively.

When the quantity of the fiber tufts accumulated in the weigh-pan 46 becomes a predetermined weight, the first balance measuring rod 48 turns according to the turning motion of the balance rod 47, the first sensing device 51 meets the free end of the rod 48 anad the first sensing device 51 issues a signal to control the motion of the control motor 70. Accordingly, the output speed of the speed regulating device 71 is changed to its slow speed by the control action of the control motor 70. Consequently, the driving speed of the lifting apron 69 is gradually lowered to a predetermined slow speed so that the supply rate of the material fibers W to the weigh-pan device 45 is gradually reduced. When the driving speed of the lifting apron 69 becomes the above-mentioned predetermined speed, (or during the above-mentioned period of reducing the driving speed), the motion of the control motor 70 is stopped by a conventional means, for example, limit switches or a cam mechanism. Such a mechanism is well known and, therefore, exampled construction utilizing limit switches 72, 73 is shown in FIG. 10. That is, the speed regulating device 71 comprises a bracket 74 provided with a pair of fulcrums 75, 76 and a pair of levers 77, 78, which are capable of turning about the respective fulcrums 75, 76, and an input shaft 79 connected to the output shaft of the second pulley-driving mechanism 37, an output shaft 80 connected to the third pulley-driving mechanism 38, an input pulley 81 spline engaged to the input shaft 79 and an output pulley 82 spline engaged to the output shaft 80, a control shaft 83 provided with a pair of threaded portions 83a, 83b to which the levers 77 and 78 are thread engaged so that the distance betwen the engaged portions of these levers 77 and 78 can be changed by turning the shaft 83 which is driven by the control motor 70. The pulleys 81, 82 comprise a pair of side pulleys 81a, 81b and 82a, 82b which are capable of displacing along the respective spline shafts 79, 80 by turning the levers 77, 78 about the respective fulcrums 75, 76. Therefore, the driving ratio between the pulleys 81 and 82 by way of an endless belt 84 can be easily changed by turning the shaft 83. To restrict the changing of the above-mentioned driving ratio, the limit switches 72, 73 are provided along the path of movement of an end of the lever 77 as shown in FIG. 10. The limit switch 72 actuates to stop the control motor 70.

When the control motor 70 is stopped, the pilot motor 19 is actuated by the signal issued from the limit switch 72 via a relay (not shown) so that the actuation mechanism 18 is actuated. Consequently, the nut-like members 25 are displaced in turn the Y shaped arm 16 so that the gauge between the lifting apron 69 and the evener cylinder 14 is reduced. According to the above-mentioned reduction of the gauge between the lifting apron 9 and the evener cylinder 14, and the lowering of the driving speed of the lifting apron 69, the mass of the fiber tufts supplied into the weigh-pan 46 is gradually changed to a smaller size and the supply rate of material into the weigh-pan is also gradually reduced. When the displacement of the evener cylinder 14 toward the lifting apron 69 is stopped at the predetermined small gauge, the limit switch 60 of the actuation mechanism 18 (FIG. 4) contacts the nut-like member 25 so that the driving of the pilot motor 19 is stopped. Therefore, the gauge between the lifting apron 69 and the evener cylinder 14 is fixed at the predetermined small value. After the above-mentioned changing motion of the gauge, the size of the fiber tufts supplied into the weigh-pan 46 is restricted by the above-mentioned gauge and the supply rate of fiber tufts into the weigh-pan 46 is defined by the slow driving speed of the lifting apron 69.

When the balance rod 47 is further turned according to the increased weight of the accumulated material fibers in the weigh-pan 46, and the free end of the second balance measuring rod 52 meets the second sensing device 55, the sensing device 55 detects the condition that the weight of the accumulated fiber tufts in the weigh-pan 46 becomes the predetermined maximum value of the unit operation and the clutch 40 of the fourth pulley-driving mechanism is actuated so as to stop the lifting apron 69. Simultaneously the solenoid of the shutter 28 is actuated so as to close the feed passage from the lifting apron 69 to the weigh-pan 46. Consequently possible excess supply of fiber tufts to the weigh-pan 46 is perfectly prevented. Then, the actuation mechanism 58 is actuated by the signal of the second sensing device 56 so as to open the doors of the weigh-pan 46.

In a manner similar to the first embodiment, after completion of the above-mentioned unit supply operation to the feed conveyer 2 from the opening machine 1, the driving condition of the lifting apron 69 and the gauge between the lifting apron 69 and the evener cylinder 14 are changed to their initial conditions and, thereafter, the subsequent supply operation is commenced.

As mentioned above, a very precise regulation of supply quantity of fiber material to the weigh-pan in a unit supply operation can be carried out by the second embodiment.

According to our experimental mill test of the second embodiment, it was found that the clutch 40 can be omitted if the user of the machine does not need so severe condition like the second embodiment. That is, in this modification of the second embodiment, when the second detecting device 56 detects the predetermined final quantity of fiber tufts accumulated in the weigh-pan 46, the lifting apron 69 is not stopped, but driven at the reduced speed adjusted by the speed changing mechanism 70 when the first sensing device 51 detects the predetermined intermediate quantity accumulated in the weigh-pan 46. Therefore, fiber tufts of small size are continuously supplied by the lifting apron 69 into the chute 27. However, the shutter 28 closes the discharge aperture of the chute 27 so that any excess feed of the fiber tufts to the weigh-pan 46 is prevented. After a predetermined time interval, the driving speed of the lifting apron 69, the gauge between the lifting apron 69 and the evener cylinder 14, are returned to their starting condition of each unit supply operation, the weigh-pan 46 is closed by the same method as the second embodiment. Then the shutter 28 is opened in the chute 27 in order to start the next unit supply operation.

Figure 11:
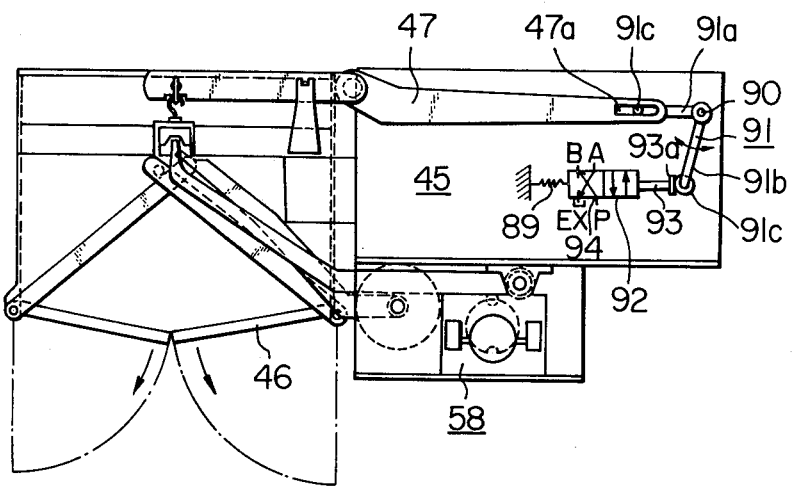
FIG. 11 is a schematic side view of another embodiment of weigh-pan according to the present invention.
Figure 12:
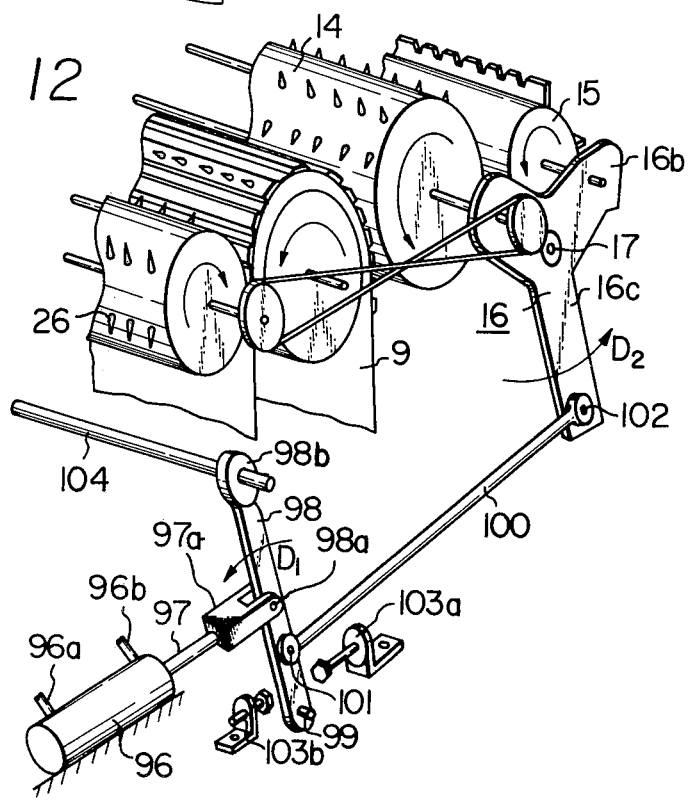
FIG. 12 is a perspective view of a main part of a modified regulating apparatus related to the weigh-pan shown in FIG. 11.

Further embodiment of the regulating device according to the present invention is shown in FIGS. 11 anad 12. In this embodiment, the mechanism of the weighing device 45 is almost similar to the weighing device 45 of the first embodiment shown in FIGS. 2 to 5, therefore these identical elements are represented by the identical reference numerals. However, instead of utilizing the balance mechanism, a hydraulic balance means is applied. Referring to FIG. 11, the above-mentioned hydraulic balance means comprises a hydraulic cylinder 92 provided with a plunger 93 and a change valve 94, and a L shaped connecting rod 91 turnably mounted on the frame of the weighing device 45 by a pivot pin 90. The balance rod 47 of the weighing device is provided with a slot 47a formed at a free end portion thereof, and a guide pin 91c secured to a horizontal portion 91a of the L shaped lever 91 is slidably engaged in a slot 47a. A free bottom end 91b of the L shaped lever 91 is provided with a roller 91c turnably mounted thereon. The hydralic cylinder 92 is provided with a piston (not shown) which is always urged toward the L shaped lever 91 by a spring 89, consequently, the head portion of the plunger 93 is always urged to the roller 91c. The change valve 94 is provided with an exhaust aperture (EX) and an inlet aperture (P) for supplying the pressurized fluid into the hydraulic cylinder 92, and apertures (A) and (B) which are capable of alternately connected with the exhaust aperture (EX) or the inlet aperture (P) respectively by displacing the piston. When the plunger 93 is displaced toward the hydraulic cylinder 92, the inlet aperture (P) is connected to the aperture (B) and the exhaust aperture (EX) is connected to the aperture (A), while the plunger 93 is displaced toward the opposite direction to the hydraulic cylinder 92, the exhaust aperture (EX) is connected to the aperture (B) and the inlet aperture (P) is connected to the aperture (A). The spring 89 is selected so as to satisfy the following condition that, when the weight of the fiber tufts fed into the weigh-pan 46 becomes a predetermined value which corresponds to a predetermined intermediate quantity of fiber tufts accumulated in the weigh-pan at a time of shortly before the completion of the unit supply operation, the connection of the inlet aperture (P) to the aperture (B) and the connection of the exhaust aperture (EX) to the aperture (A) are capable of changing to the connection of the exhaust aperture (EX) to the aperture (B) and the connection of the inlet aperture (P) to the aperture (A). The gauge regulating means of this embodiment is quite similar to the first embodiment shown in FIG. 4. However, the device for actuating this gauge regulating means is different from the first embodiment. Referring to FIG. 12, the actuating device comprising a hydraulic cylinder 96 provided with a piston (not shown) and a plunger 97 connected to the piston (not shown). This piston divides the hydraulic cylinder 96 into two separate chambers (not shown), and a pair of inlet conduits 96a and 96b are connected to the above-mentioned two separate chambers. For example, the conduit 96a is connected to a chamber which is an opposite side to the plunger 97 while the conduit 96b is connected to a chamber which is a side of the plunger 97. The above mentioned inlet conduits 96a and 96b are connected to the apertures (A) and (B) of the hydraulic cylinder 94 respectively. An arm 98 is turnably supported by a pin shaft 99 mounted on the machine frame and a two fork member 97a, which is secured to the plunger 97, is turnably connected to the arm 98 by a pin 98a. Therefore, the arm 98 is capable of turning about the pin shaft 99 by the motion of the plunger 97. A connecting rod 100 is connected to the arm 98 and the guide arm 16c of the arm 16 by pivot pins 101 and 102 respectively as shown in FIG. 12. Consequently, the turning motion of the arm 98 is transferred to the guide arm 16c. A pair of stoppers 103a and 103b are adjustably mounted on the machine frame in such a condition that these stoppers 103a and 103b restricts the range of the turning motion of the arm 98. At the opposite side of the machine, there is provided with the arm and the connecting rod which are similar to the arm 98 and the connecting rod 100 respectively, and these arms are connected by a connecting rod 104 which is secured to the top end portion of each arm. In FIG. 11, the top end portion of the arm 98 is represented by 98b.

According to the utilization of the above-mentioned actuation mechanism, when the quantity of the fiber tufts supplied into the weigh-pan 46 becomes the above-mentioned predetermined intermediate value, the balance rod 47 turns upward in FIG. 10, consequently, the free bottom end 91b of the L shaped lever 91 pushes the head 93a of the plunger 93 so that the original condition, wherein the exhaust valve (EX) is connected to the aperture (A) which is connected to the inlet conduit 96a and the inlet valve (P) is connected to the aperture (B) which is connected to the inlet conduit 96b, is changed to the regulated condition wherein the exhaust valve (EX) is connected to the aperture (B) which is connected to the inlet aperture 96b, and the inlet valve (P) is connected to the aperture (A) which is connected to the inlet aperture 96a.

According to the above-mentioned changing of connection of fluid passage, the plunger 97 is displaced toward inside of the hydraulic cylinder 96, consequently, the arm 98 and the guide arm 16c are turned toward the directions $D_1$, $D_2$ as shown in FIG. 12. The intervened space between the evener cylinder 14 and the top end portion of the lifting apron 9 can be reduced. In this embodiment, a non-contact limit switch (not shown) is disposed in the weighing device 45 at a terminal position of the free end portion of the balance arm 47. When the quantity of fiber tufts supplied into the weigh-pan 46 becomes a predetermined final value, the free end of the balance arm 47 arrives at the above-mentioned terminal position, and the non-contact limit switch is actuated at this condition and issues an electrical signal to actuate the actuation mechanism 58 for opening the weigh-pan 46 and closing the shutter 28. The above-mentioned operation of the actuation mechanism 58 is carried out by the manner similar to the first embodiment.

What is claimed is:

1. In a spinning machine comprising a hopper for receiving textile fiber material and a weighing device for supplying a predetermined quantity of opened fiber tufts to a subsequent process by intermittently repeated unit operations, a lifting apron for carrying fiber tufts supplied into said hopper towards an upper portion of said spinning machine and an evener cylinder for preventing possible supply of fiber tufts having excess size to said weighing device and a doffer for stripping fiber tufts carried to a top portion of said lifting apron towards said weighing device, a feed chute disposed above said weighing device, a shutter disposed at a bottom aperture of said feed chute capable of closing said bottom aperture, said evener cylinder disposed at a position adjacent to a top portion of said lifting apron, a driving means for driving said lifting apron, said weighing device provided with a weigh-pan, an apparatus for regulating a supply quantity of fiber tufts to said weigh-pan in each unit supply operation, comprising in combination, means for selectively reducing a gauge between said lifting apron and said evener cylinder, a first device for actuating said gauge reducing means at a time of shortly before the completion of said unit supply operation, a second device for substantially opening said weigh-pan and closing said shutter when a predetermined final quantity of fiber tufts are accumulated in said weigh-pan during said unit supply operation.

2. In a spinning machine comprising a hopper for receiving textile fiber material and a weighing device for supplying a predetermined quantity of opened fiber tufts to a subsequent process by intermittently repeated unit operations, a lifting apron for carrying fiber tufts supplied into said hopper towards an upper portion of said spinning machine and an evener cylinder for preventing possible supply of fiber tufts having excess size to said weighing device and a doffer for stripping fiber tufts carried to a top portion of said lifting apron towards said weighing device, a feed chute disposed above said weighing device, said evener cylinder disposed at a position adjacent to a top portion of said lifting apron, a driving means for driving said lifting apron, said weighing device provided with a weigh-pan, an apparatus for regulating a supply quantity of fiber tufts to said weigh-pan in each unit supply operation, comprising in combination, means for selectively reducing a gauge between said lifting apron and said evener cylinder, means for actuating said gauge reducing means, a first device for sensing a predetermined intermediate quantity of fiber tufts accumulated in said weigh-pan at a time of shortly before the completion of said unit supply operation, a second device for sensing a predetermined final quantity of fiber tufts accumulated in said weigh-pan during said unit supply operation, an actuation mechanism for opening, said weigh-pan by a signal issued from said second sensing device, means for selectively disconnecting said first sensing device electrically connected to said means for actuating said gauge reducing means, whereby, when said first sensing means detects said predetermined intermediate quantity of fiber tufts said actuating means actuates motion of said gauge reducing means, by a signal issued from said first sensing device, and when said second sensing means detects said predetermined final quantity of fiber tufts, said weigh-pan is opened by a signal issued from said second detecting device.

3. An apparatus for regulating a supply quantity of fiber tufts to a weigh-pan in each unit supply operation according to claim 2, further comprising clutch means for selectively disconnecting said lifting apron from said driving mechanism, said second sensing device electrically connected to said clutch means, whereby when said second sensing device detects said final quantity of fiber tufts, said clutch means is actuated by an electrical signal issued from said second detecting device.

4. An apparatus for regulating a supply quantity of fiber tufts to a weigh-pan in each unit supply operation according to claim 2, further comprising a shutter disposed at a position above said weigh-pan in a supply passage of fiber tufts to said weigh-pan and an electric means for closing said supply passage by turning said shutter, said electric means is connected to said second sensing device.

5. An apparatus for regulating a supply quantity of fiber tufts to a weigh-pan in each unit supply operation according to claim 2, wherein said lifting apron is continuously driven at a high speed during said unit supply operation.

6. An apparatus for regulating a supply quantity of fiber tufts to a weigh-pan in each unit supply operation according to claim 2, further comprising a speed change mechanism for selectively reducing a driving speed of said lifting apron at a predetermined time point of shortly before the completion of said unit supply operation, said speed change mechanism is actuated by a signal issued from said first sensing device.

7. An apparatus for regulating a supply quantity of fiber tufts to a weigh-pan in each unit supply operation according to claim 2, wherein said first actuating device comprises a hydraulic change valve provided with a pair of apertures being capable of alternately connected either one of an exhaust valve or an inlet valve connected to a pressurized fluid source, a mechanical means for actuating said hydraulic change valve when quantity of fiber tufts accumulated in said weigh-pan becomes a predetermined intermediate valve at a time of shortly before the completion of said unit supply operation, a hydraulic cylinder provided with a pair of inlet conduits connected to either one of said appertures of said hydraulic change valve and a plunger, a pair of arms turnably mounted on a machine frame at both sides thereof, a connecting rod connecting both top end portions of said arms, one of said arm being pivotably connected to a free end portion of said plunger; said means for selectively reducing a gauge between said lifting apron and said evener cylinder is provided with a pair of Y shaped arms turnably supported by the respective pivot shafts mounted on said machine frame, said evener roller is rotatably supported by said Y shaped arms; said arms of said first actuating device are pivotably connected to corresponding Y shaped arms respectively.

8. An apparatus for regulating a supply quantity of fiber tufts to a weigh-pan in each unit supply operation according to claim 2, wherein said means for selectively reducing a gauge between said lifting apron and said evener cylinder comprises a pair of Y shaped arm turnably supported by the respective pivot shafts mounted on a machine frame, and a pair of actuation mechanisms for turning said Y shaped arms about said pivot shaft simultaneously and a pilot motor for selectively operating said actuation mechanisms simultaneously, said pilot motor is electrically connected to said first sensing device.

9. An apparatus for regulating a supply quantity of fiber tufts to a weigh-pan in each unit supply operation according to claim 8, wherein each of said Y shaped arms is provided with a pair of upwardly projected arms extended from a turning axis thereof and a downwardly projected arm extended from said turning axis thereof, one of said upwardly projected arms is provided with a bearing for turnably supporting an end of a shaft of said evener cylinder while the other upwardly projected arm is provided with a bearing for turnably supporting an end of a shaft of said stripper, said downwardly projected arm is connected to said actuation mechanism for selectively turning thereof.

10. An apparatus for regulating a supply quantity of fiber tufts to a weigh-pan in each unit supply operation according to claim 9, wherein one of said actuation mechanisms is provided with a pair of limit switches for restricting a range of turning motion of said Y shaped arm, said limit switch is combined in an electrical connection between said pilot motor and an electric source.

* * * * *